US010272621B2

(12) United States Patent
Ponsolle et al.

(10) Patent No.: US 10,272,621 B2
(45) Date of Patent: Apr. 30, 2019

(54) RESIN COATED RADIUS FILLERS AND METHOD OF MAKING THE SAME

(75) Inventors: Dominique Ponsolle, Winona, MN (US); Scott Alfred Rogers, Placentia, CA (US); Robert Blackburn, Hull (GB); Jonathan Meegan, Chester (GB)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 552 days.

(21) Appl. No.: 13/454,761

(22) Filed: Apr. 24, 2012

(65) Prior Publication Data

US 2012/0308817 A1 Dec. 6, 2012

Related U.S. Application Data (60) Provisional application No. 61/493,277, filed on Jun. 3, 2011.

(51) Int. Cl.
*B29B 15/12* (2006.01)
*B29C 70/22* (2006.01)
*B29C 70/52* (2006.01)
*B29L 31/00* (2006.01)

(52) U.S. Cl.
CPC .......... *B29C 70/522* (2013.01); *B29B 15/125* (2013.01); *B29C 70/222* (2013.01); *B29L 2031/001* (2013.01); *Y10T 428/2915* (2015.01)

(58) Field of Classification Search
CPC .............. B05D 1/18; D02G 3/22; B05C 3/02
USPC ............................................ 428/292.1–301.4
See application file for complete search history.

(56) References Cited

U.S. PATENT DOCUMENTS

| 3,574,665 | A | 4/1971 | Basche |
| 4,305,770 | A | 12/1981 | Stiles |
| 4,677,818 | A | 7/1987 | Honda et al. |
| 5,026,595 | A | 6/1991 | Crawford, Jr. et al. |
| 5,451,355 | A | 9/1995 | Boissonnat et al. |
| 5,650,229 | A | 7/1997 | Gross et al. |
| 5,837,372 | A | 11/1998 | Wilkinson et al. |
| 5,952,067 | A * | 9/1999 | Head ................. D04C 1/02 428/36.3 |
| 6,007,917 | A * | 12/1999 | Weigel et al. ............. 428/408 |
| 6,231,941 | B1 * | 5/2001 | Cundiff et al. ........... 428/36.3 |
| 2006/0057331 | A1 * | 3/2006 | Lucas ................. B32B 3/12 428/117 |
| 2006/0130642 | A1 * | 6/2006 | Tomich ............... B29C 70/222 87/9 |

(Continued)

FOREIGN PATENT DOCUMENTS

| CN | 101913255 A | 12/2010 |
| EP | 1094042 A1 | 4/2001 |

(Continued)

OTHER PUBLICATIONS

ISR/Written Opinion for PCT/US2012/034751 dated Aug. 2, 2012.

*Primary Examiner* — Jennifer A Chriss
*Assistant Examiner* — Ricardo E Lopez
(74) *Attorney, Agent, or Firm* — Thi Dang (57) ABSTRACT

A deformable, coated radius filler composed of a continuous or elongated fibrous structure and a tacky, resin surface coating formed by pulling a dry, continuous or elongated fibrous structure through a heated resin bath. The coated radius filler has an inner portion that is substantially free of resin and the resin surface coating has a substantially uniform thickness.

15 Claims, 5 Drawing Sheets

(56) References Cited

U.S. PATENT DOCUMENTS

2008/0213490 A1* 9/2008 Strange et al. ............... 427/386
2011/0049750 A1   3/2011 Bechtold

FOREIGN PATENT DOCUMENTS

| JP | 1016612 A | 1/1989 |
| JP | 2005-288939 | 10/2005 |
| WO | WO2007038674 A1 | 4/2007 |
| WO | 2007/077835 A1 | 7/2007 |
| WO | W02009140555 A2 | 11/2009 |

* cited by examiner

RESIN COATED RADIUS FILLERS AND METHOD OF MAKING THE SAME

CROSS REFERENCE TO RELATED APPLICATION

This application claims the benefit of U.S. Provisional Patent Application No. 61/493,277 filed Jun. 3, 2011, the disclosure of which is incorporated by reference in its entirety.

BACKGROUND

The current method of manufacturing composites having complex shapes is by forming a reinforcement fiber preform of a particular shape, placing the preform in a vacuum bag or mold, infusing the preform with liquid resin, and then heating the impregnated preform to cure it into the final composite part. During the preparation of some preforms, it is common to encounter a void space or cavity at various junctions formed between different layups of fiber plies. Fillers have been conventionally used to fill such a cavity.

SUMMARY

The present disclosure relates to radius fillers useful in aerospace applications such as aircraft structural components. The radius filler is a deformable, coated structure comprising a continuous or elongated fibrous structure and a tacky, resin surface coating formed by pulling a dry, continuous or elongated fibrous structure through a heated resin bath, wherein the coated radius filler has an inner portion that is substantially free of resin and the resin surface coating has a substantially uniform thickness.

DETAILED DESCRIPTION

For composite parts made out of prepreg materials, the common practice has been to use the same material used in the joining section, and to roll it to form a filler. This approach is time consuming, inefficient and has the particular disadvantage of manufacturing fillers of limited length. To alleviate this short coming, some solutions involve manufactured prepreg fillers made of continuous tows where several tows are prepregged either individually or bunched up together. In some cases, these tows can be run through a die to pre-shape the filler to a desired cross section profile, mimicking the cavity profile they will fill. One or more fillers are used per cavity, depending on the size of the cavity, the size and shape of the filler, the ability of the filler(s) to fill the cavity, the desired mechanical performance of the part and some other constraints such as handling of the filler(s), placement in the cavity, material inventory management, etc. In another approach, a machine is provided to take several prepreg tapes and produce a filler of a continuous length, and pre-shaped to a desired profile. Such prepreg radius fillers have in common a large amount of resin typically 30% to 40% by weight of the product. The resin distribution is such that it has generally wet out the vast majority of the fibers that form the filler. Prepreg fillers usually have some level of tack that can be enhanced during the lay down process by heating the filler with a heat gun for instance. Handling, flexibility and malleability of prepreg fillers is usually poor, rendered difficult by the resin that prevents free motion of the filler fibrous structure, even when the filler is warmed up with a heat gun. Finally in the case of composite parts made of prepreg materials, adhesive resin fillers were also developed as an alternative to prepreg fillers. In this case, the filler is 90% to 100% made of resin, with on occasion, a light scrim embedded into the resin filler to provide higher handling characteristics.

In recent years, the number of composite parts manufactured via a Resin Infusion (RI) process has considerably increased. RI is not only used to manufacture small complex parts but it is also now used to manufacture the entire wings, or other very large parts of aircraft. Although in some cases, the forming of the parts via a textile preforming process may eliminate the need for a filler—in the case of π preforms for instance—the large majority of RI parts, especially large parts, still rely on tackified broadgoods or textiles that are folded to form the desired shape, which creates cavities that need to be filled with fillers. The tackified broadgoods can be rolled into a noodle filler. This method can only produce short-length fillers and is by far the least cost effective approach. Other approaches rely on partially impregnating individual or multiple tows or ropes or braids with a tackifier. The purpose of the tackifier is to provide some level of tackiness to the filler in order to position it in the cavity while the preform is being assembled. Unfortunately, most tackifiers must be heat activated to provide their tackiness characteristic. This requires warming up the filler with a heat gun, for instance, during its lay down. In some cases, the tackifier may be a sprayable, solvent-based resin, which requires full solvent removal, thereby presenting safety and laminate void content issues. This may at times be a difficult task, requiring more than one operator, and can even become questionable from a safety hazard stand point and possible material degradation. Attempts to use prepreg fillers or solid fillers in a cavity of a part to be processed via RI have not been very successful as the integration between the RI part and the prepreg filler, due to cure cycle differences, does not exist, and compatibility between the materials is poor, resulting in mechanical issues.

Finally, pre-shaped fillers have been found to be difficult to handle and position within the cavity to be infused with resin. Cavities of structural parts may have complex profiles, thus, it is important to match the shape of the pre-shaped filler to the profile of the cavity. This matching requirement burdens unnecessarily the manufacturing operators. In some applications, the profile of the cavity even changes with the location in the part. It is thus extremely difficult to manufacture a filler with a varying cross section to suit the cavity profile. Furthermore, the associated cost of such filler would be far beyond the need and performance of its function. Moreover, many conventional pre-shaped fillers are very stiff and cannot be bent, risking damaging their profile, and as such can only be made of a discrete length for handling and shipping reasons, this limiting their attractiveness. For those fillers that are somewhat less stiff, and can be wound onto very large diameter cores, e.g. 20 inches and up, special grooved cores are necessary in order to maintain the shape of the filler and avoid its twisting. Furthermore, the amount of filler deposited on this type of core is usually limited by the groove spacing and size of the core (diameter and length). These packaging requirements increase the overall cost of such a product and reduce its attractiveness.

Figure 1:
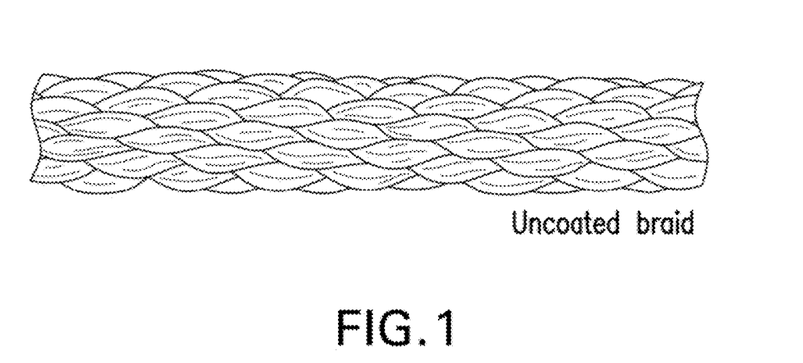
FIG. 1 illustrates an exemplary braid structure that may be used to form a coated radius filler.

This present disclosure relates to coated fillers for use in composite preforms that are subjected to a resin infusion (RI) process. More specifically, the coated fillers take the form of continuous or elongated fillers for filling in a cavity of a three-dimensional composite preform structure. The coated fillers are deformable and malleable so that they can conform to various cavity geometries. In one embodiment, the continuous or elongated filler to be coated is in the form of a dry, continuous, braided structure, for example, a fiber braid made of a plurality of individual fiber strands intertwined in a braided pattern. FIG. 1 illustrates an exemplary braid structure that may be used to form the coated filler. The fiber braid may have a solid inner portion or a hollow core. The coated fillers are referred herein as "radius fillers". Also disclosed herein is a method of forming a resin surface coating onto a dry, continuous or elongated filler, whereby the resultant coated filler retains a tacky outer surface at room temperature. The coated filler becomes stiffer than the original uncoated filler but it is still bendable/malleable.

The term "tacky" or "tackiness" as used herein refers to the ability of the coated fillers to stick to a surface for a period of time.

Resin infusion (RI) is a generic term which covers processing techniques such as resin transfer molding, liquid resin infusion, vacuum assisted resin transfer molding, resin infusion with flexible tooling, vacuum assisted resin infusion, resin film infusion, controlled atmospheric pressure resin infusion, vacuum assisted process and single line injection. Resin infusion may be used in the fabrication process of a structural part, in which liquid resin is drawn into a dry fibrous preform which is kept under vacuum. The dry fibrous preform may take the form of a plurality of layers or plies of dry reinforcement fibers assembled in a stack or layup. Then the preform is placed in a mold or vacuum bag, and injected or infused directly in-situ with the matrix resin. The coated radius fillers of the present disclosure may be used to fill cavities formed within the dry fibrous preform.

In one embodiment, the fillers to be coated are made of uniquely designed braids which confer a tailorable deformability to fit various cavity profiles. In particular, the deformability of the filler is due to the high ratio of axial fibers over bias fibers that form the envelope of the braid. Braids may be made of 3 or more intertwined yarns, described as bias yarns that form a hollow flexible and highly deformable tube. In some cases, axial yarns are also intertwined with the bias yarns to form a hollow flexible tube with a higher cohesion, i.e. the braid is more stable or less deformable. This type of braid structure is called a "triaxial" braid because the yarns (i.e. fiber strands) are going in three different directions, contrary to the so-called "biaxial" braid because yarns are disposed in two different directions only. In other cases, the hollow section of the braid, biaxial or triaxial, can be filled with longitudinal yarns. The longitudinal yarns are defined as the core of the braid while the biaxial or triaxial structure of the braid is defined as the outer layer or shell or envelope. When braids are used, the percentage by weight of axial fibers either as fibers placed in the core of the braid or/and within the bias fibers is of at least 50%, preferably above 65%, based on the total weight of the braid. The resin coating is uniformly deposited on the outer surface of the braid, leaving the inner portion of the braid substantially resin-free. This in turn allows the core of the braid to be infused during the RI cycle. The resin remains on and within the outer surface of the braid created by the bias yarns because of a combination of a tight layer structure and a low-flowing resin at room temperature.

Specific braid architectures are the function of the braid filling purpose and the radius filler size. In general coarser braids, the ones with a diameter over 0.150 inch are used to fill the maximum volume of the cavity and are designed with a core wrapped by a biaxial sleeve while finer braids are used in the apexes of the cavity and have a triaxial design. However, other braid designs can be developed for other applications. In the case of the core and envelope construction for the coarser, braids, the core and the biaxial envelope are independent of each other and allow for free independent motion relative to each other. Furthermore, the core contains the vast majority of the fibers, at least 50%, of the filler and is made of independent parallel yarns that allow for a free motion without much constraint. This favors a good packing of the filler in the cavity. The outer envelope is independent of the core with fibers at a long angle relative to the braid longitudinal direction, e.g., less than 35°. This further favors the good handling of the radius filler. The outer layer has a good cover factor which helps to contain the resin on the braid within the shell of the filler or its surface.

In the case of triaxial braid filler, high deformability of the filler is desired to fill the cavity apexes. As such the braid structure is preferably collapsible. As such, a hollow braid structure is best suited for this purpose. The axial yarns representing about 50% by weight of the braid filler will provide a good longitudinal stability that is particularly needed during the resin coating process, and consistency in the deformability and the collapsibility of the product. Similarly to the core-shell braid, the coverage of the triaxial braid is high to help contain the resin within the outer shell or on its surface.

Figure 2:
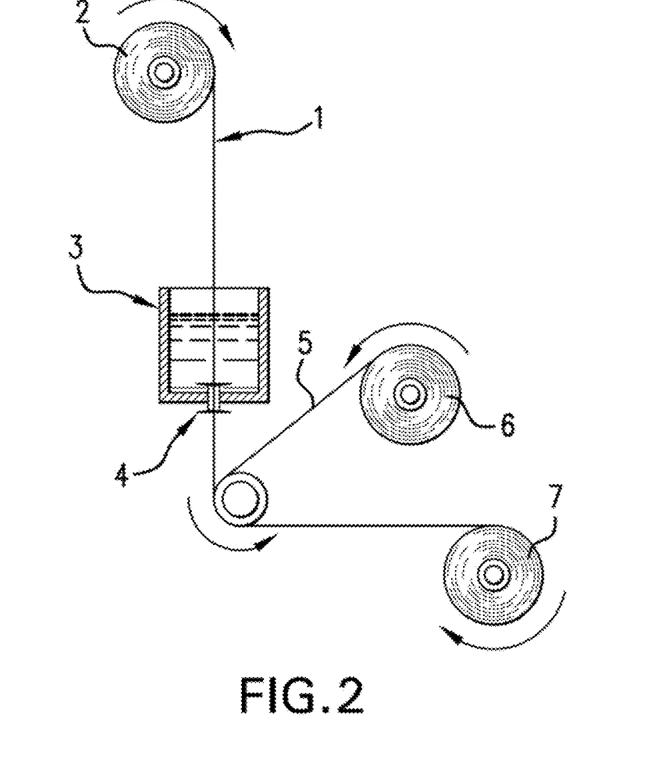
FIG. 2 schematically illustrates a surface coating method and system for forming a coated radius filler according to one embodiment.

FIG. 2 schematically illustrates a surface coating method and system for forming the coated radius fillers according to one embodiment. The surface coating method includes running (i.e. pulling longitudinally under tension) a dry, continuous fibrous structure 2, e.g. a fiber braid, supplied from a source spool 1, through a heated resin bath 3 and out through a deformable grommet 4, whereby only the desired amount of resin is deposited on the outer surface of the filler. The coated fibrous structure exiting the heated resin bath 3 is then wound with an interleave material supplied by a spool 6 before being wound up onto a storage spool 7. The interleave material is removable and an aid to winding and storage, and does not become an integral part of the finished coated filler. The interleave material allows the coated filler to be wound on itself and un-wound.

The resin coating of the radius filler is controlled by the resin viscosity, the coating process and the characteristics of the uncoated fibrous structure. For a given radius filler, the desired deposited amount of resin is controlled by processing conditions such as resin temperature which affects resin viscosity, line speed which affects residency time of the uncoated filler in the resin, diameter of the grommet through which the filler exits the resin bath, which affects how much resin is squeezed out of the coated filler. The internal diameter of the hole in the grommet is controlled and works with other control factors to provide the desired coating resin content. The major control factors include:
(a) Grommet aperture dimension (ID dimension)
(b) Resin temperature (which affects resin viscosity during coating)
(c) Resin level in the resin bath
(d) Resin age
(e) Line speed The contact time of the continuous filler with resin bath is determined by the resin level and line speed. The viscosity of the resin bath during the coating process is controlled via heating so as to enable relatively smooth and uniform surface coating, and may be in the range of 0.50 Poise-1000 Poise (0.05 Pa·s-100 Pa·s) depending on the filler surface to be coated (e.g. coarseness, texture of the braid weave). The temperature of the heated resin bath during surface coating may be in the range of 100° F.-300° F. (37.78° C.-148.89° C.), depending on the type of resin being used. Any conventional heating means may be used for heating the resin bath, for example, strip heaters around a metallic vessel to provide the heat source. The line speed may vary from 10 to 150 feet per minute (fpm) (5.08 cm/s to 76.25 cm/s), preferably 30 fpm to 60 fpm ((5.25 cm/s to 30.5 cm/s). The resin level within the coating bath directly affects the resin content of the coated filler by increasing the dwell time of the uncoated filler in the resin, thus, it may be varied to achieve the desired resin content for the coated filler. The surface tension of the resin also acts to draw the resin level down prior to the entering the grommet.

Figure 3:
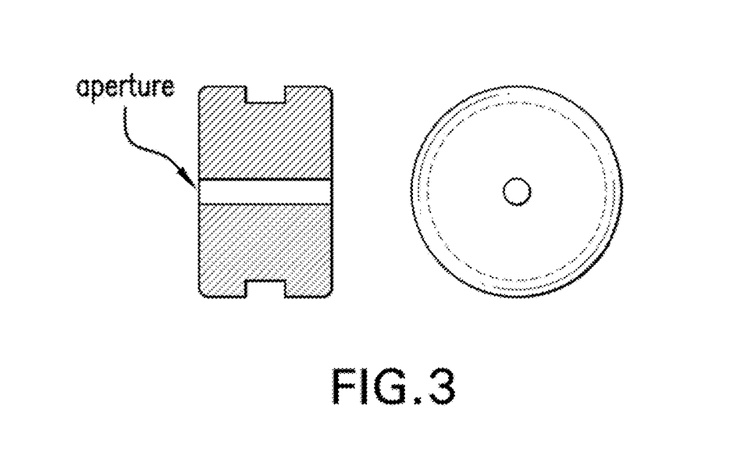
FIG. 3 shows an embodiment of a grommet design to be used in the coating method depicted in FIG. 1.

The grommet is fabricated from a deformable material and is sized to be the same or slightly below the solid diameter of the continuous filler/braid to be coated. For example, a 0.125 in (3.175 mm) ID grommet may be used for coating a braid with 0.148 in (3.76 mm) outer diameter (OD), and a 0.08 in (2.03 mm) ID grommet may be used for coating braid with 0.08 in (2.03 mm) OD. In some embodiments, in order to increase the resin content of the coated filler, the grommet inner diameter may be increased so that it is slightly larger than the diameter of the continuous filler/braid to be coated. Rubber grommets have been found to be suitable for the coating system of the present disclosure. It should be understood, however, that other elastomeric material may be used for making the grommet. FIG. 3 shows an embodiment of a suitable grommet design (cross-section view on the left, and top view on the right). It Should be noted that grommet geometry may be varied to suit the different filler cross-sectional geometries (e.g., triangle, square, oval, etc.).

The resulting coated filler produced by the coating method depicted in FIG. 2 is a deformable/malleable radius filler with a controlled resin content. The resin coating thickness of the coated filler is substantially uniform. The continuity of the surface coating is about 90%-100%. There is some penetration of the resin into the outer portion of the fibrous structure but the inner portion of the fibrous structure remains substantially free of resin.

Figure 4:
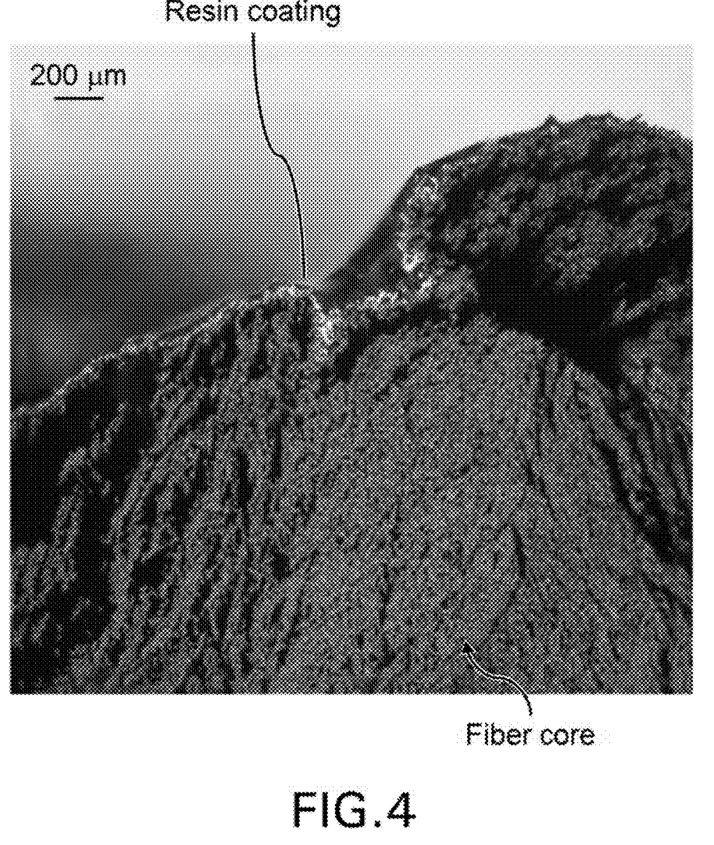
FIG. 4 is a photomicrograph of a cross-sectional portion of a coated fiber braid formed according to the coating method depicted in FIG. 1.

FIG. 4 is a photomicrograph of a cross-sectional portion of a coated fiber braid formed according to the coating method depicted by FIG. 2. This cross-section view shows that the resin forms a coating at the outer portion of the coated braid while the core fibers at the inner portion of the coated braid remain free of resin.

The amount of resin deposited onto the uncoated filler may range from 5% to 50%, preferably 10%-30%, more preferably about 15%-20%, by weight based on the total weight of the coated filler and is tailored to meet the requirements of the intended application. The resin content and surface coating substantially prevent the coated filler from restricting the resin flow during RI process when the structural part is fabricated. The developed coating method disclosed herein is very robust and stable, and allows consistent deposition of a desired amount of resin onto the filler.

The resin coated radius fillers can be economically produced in a diameter range of about 0.010 in to 1.5 in (0.254 mm to 38.1 mm) for most purposes, and may be in the range of 0.04 in to 0.4 in (1.02 mm to 10.16 mm) for certain intended purposes.

The continuous or elongated fibrous structure to be coated may be made of organic or inorganic fibers including fibers made of polymer, carbon, graphite, glass, quartz, aramid (e.g. Kevlar), PBO, polyethylene, inorganic oxide, carbide, ceramic, metal, or combinations thereof.

The coating, resin may be a coating formulation containing one or more thermosetting resins that include, but are not limited to members of the group consisting of epoxy resin, addition-polymerisation resin, bis-maleimide resin, cyanate ester resin, phenolic resin, polyester resins, vinyl ester resins, and combinations thereof.

Furthermore, the resin may be a hot-melt resin, which means that the resin is a solvent-free resin that is liquid at temperatures greater than room temperature and a solid or semisolid at room temperature. Hot melt coating processes rely on controlling the viscosity of the resin polymer with temperature. When hot melt epoxy resin is used, the resin may be preheated in an oven (e.g., at 100° F.-250° F. or 37.78° C.-121.11° C.) prior to the start of the coating process to allow the resin to be poured into the process vessel.

Examples of epoxy-based resins suitable for the coating formulation includes Cycom® 890 RTM resin and Cycom® 823 RTM resinfrom Cytec Industries Inc. (both are liquid epoxy resins designed for Resin Transfer Moulding). Other possible epoxy-based resins that can be used include an epoxy resin selected from N,N,N'N'-tetraglycidyl diamino diphenylmethane (e.g. "MY 9663", "MY 720" or "MY 721" sold by Ciba-Geigy) viscosity 10-20 Pa·s at 50° C.; (MY 721 is a lower viscosity version of MY 720 and is designed for higher use temperatures); N,N,N',N-tetraglycidyl-bis(4-aminophenyl)-1,4-diisopropylbenzene (e.g. Epon 1071 sold by Shell Chemical Co.) viscosity 18-22 Poise (1.8-2.2 Pa·s) at 110° C.; N,N,N',N'-tetraglycidyl-bis(4-amino-3,5-dimethylphenyl)-1-,4-diisopropylbenzene, (e.g. Epon 1072 sold by Shell Chemical Co.) viscosity 30-40 Poise (3-4 Pa·s) at 110° C.; triglycidyl ethers of p-aminophenol (e.g. "MY 0510" sold by Ciba-Geigy), viscosity 0.55-0.85 Pa·s at 25° C.; preferably of viscosity 8-20 Pa·s at 25° C.; preferably this constitutes at least 25% of the epoxy components used; diglycidyl ethers of bisphenol A based materials such as 2,2-bis(4,4'-dihydroxy phenyl) propane (e.g. "DER 661" sold by Dow, or "Epikote 828" sold by Shell), and Novolak resins preferably of viscosity 8-20 Pa·s at 25° C.; glycidyl ethers of phenol Novolak resins (e.g. "DEN 431" or "DEN 438" sold by Dow); diglycidyl 1,2-phthalate, e.g. GLYCEL A-100; diglycidyl derivative of dihydroxy diphenyl methane (Bisphenol F) (e.g. "PY 306" sold by Ciba Geigy) which is in the low viscosity class. Other epoxy resin precursors include cycloaliphatics such as 3',4'-epoxycyclohexyl-3,-4-epoxycyclohexane carboxylate (e.g. "CY 179" sold by Ciba Geigy) and those in the "Bakelite" range of Union Carbide Corporation.

Examples of addition-polymerisation resins are acrylics, vinyls, bis-maleimides, and unsaturated polyesters.

Suitable bismaleimide resins are heat-curable resins containing, the maleimido group as the reactive functionality.

The term bismaleimide as used herein includes mono-, bis-, tris-, tetrakis-, and higher functional maleimides and their mixtures as well, unless otherwise noted. Bismaleimide resins with an average functionality of about two are preferred. Bismaleimide resins as thus defined are prepared by the reaction of maleic anhydride or a substituted maleic anhydride such as methylmaleic anhydride, with an aromatic or aliphatic di- or polyaniine. The closely related nadicimide resins, prepared analogously from a di- or polyamine but wherein the maleic anhydride is substituted by a Diels-Alder reaction product of maleic anhydride or a substituted maleic anhydride with a diene such as cyclopentadiene, are also useful. As used herein, the term bismaleimide shall include the nadicimide resins. Also useful are bismaleimide "eutectic" resin mixtures containing several bismaleimides. Such mixtures generally have melting points which are considerably lower than the individual bismaleimides.

In one embodiment, the resin used for surface coating is an epoxy-based resin that has been modified with a viscosity modifier such that process and performance compatibility is retained but that the ambient viscosity is such that it produces a surface tackiness for positioning purposes and low-flow behavior. The viscosity modifier may be selected from thermoplastic polymers and rubbers. Such modified resin is a modified low-flow version of the resin used in resin infusion process, which is usually a high-flow, low-viscosity resin that satisfies the requirements of the RI process. The low-flow resin formulation is achieved by adding a high-viscosity thermoplastic polymer or rubber to the base low-viscosity epoxy resin in a quantity ranging from 5% to 20% based on the total weight of the resin formulation, preferably 10 to 15%, depending on the epoxy type, the curing agent type and the desired resin flow. Furthermore, the resin surface coating is formulated so as to be compatible with the infusion process resin with respect to tack and rheology behavior during the manufacturing of composite structures.

The thermoplastic viscosity modifier may be selected from, but not limited to, a group consisting of cellulose derivatives, polyester, polyamide, polyimide, polycarbonate, polyurethane, poly(methyl methacrylate), polystyrene, polyaromatics; polyesteramide, polyamideimide, polyetherimide, polyaramide, polyarylate, polyacrylate, poly(ester) carbonate, poly(methyl methacrylate/butyl acrylate), polysulphone; polyethersulphone, polyetherethersulphone polyethersulphone-etherketone, and copolymers thereof, polyetheretherketone (PEEK), polyetherketoneketone (PEKK), nylon, and combinations thereof. As an example, a commercially, available thermoplastic viscosity modifier that may be used is Cytec KM® 180 (co-polymer of polyethersulfphone (PES) and polyetherethersulphone (PEES) available from Cytec Industries).

As one example, the low-flow resin coating formulation may be comprised of a liquid epoxy-based resin, e.g., Cycom® 890 RTM or Cycom® 823 RTM, that has been modified by adding a PES-PEES copolymer, e.g. Cytec KM® 180; as viscosity modifier.

The surface coating resin formulation may further comprise conventional additives such as a curing agent and/or a catalyst. Additional flow modifiers such as silica particles (e.g. Cabosil from Cabot Corp.) may also be added to the resin coating formulation to further fine tune the resin viscosity. It should be understood that resin viscosity influences the coating process, the tack-out time of the coated filler, and the reaction of the filler to the RI process. The "tack-out time" refers the time of exposure to ambient conditions during which the product is able to provide positioning tack as measured in hours or days.

The coated radius filler produced by the coating method disclosed herein may be used to fill the radial cavity created in composite structural parts. This concept can also be used in other applications where cavities created by the joining of fabric plies to form a specific section that must be filled. Further, the coated radius filler is to be used in applications where composite parts are manufactured via RI process.

Figure 5:
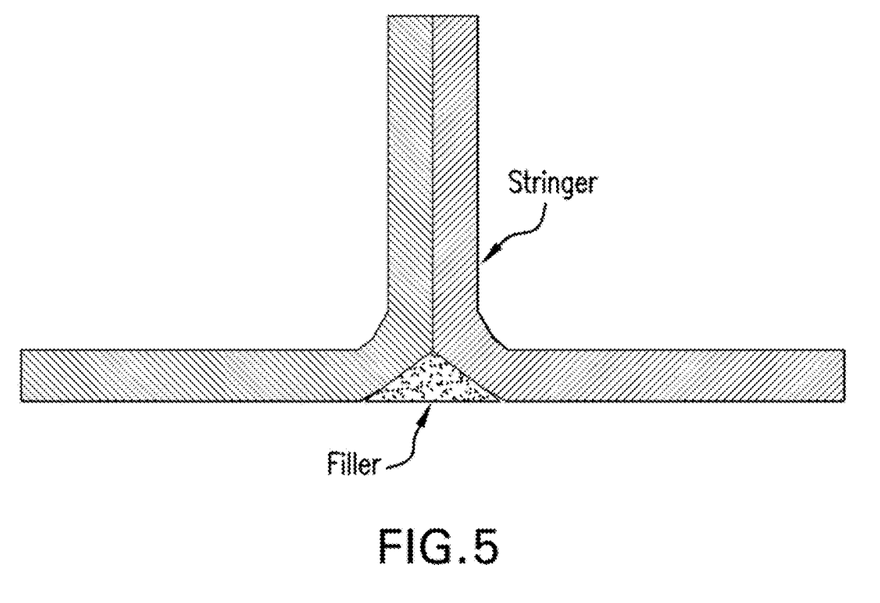
FIG. 5 schematically shows the cross-section of a type of preform structure having a cavity to be filled with radius fillers.
Figure 6:
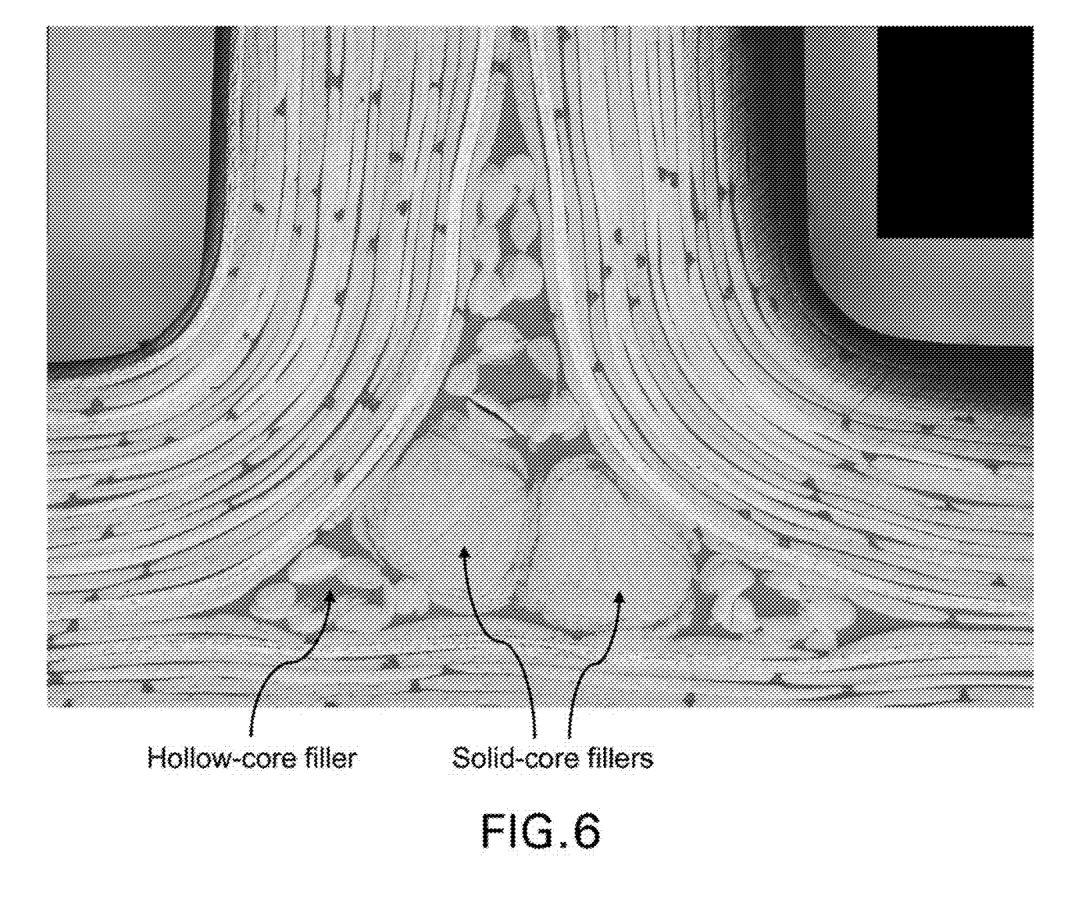
FIG. 6 is a photomicrograph showing the cross-section of an infused stringer structure in which two types of coated fiber braids are used as radius fillers.

An example of the application for the coated radius fillers will be described with reference to FIG. 5. When two "L" shaped sections of fiber preforms are joined to form a "T" shaped section on a substantially flat surface, a cavity with apexes is formed. Each of the "L" shaped pre-form sections is composed of a plurality of fibrous plies. FIG. 5 shows the cross-section of this type of preform structure. This type of preform structure is suitable for the fabrication of an aircraft stringer. This cavity may be filled with the coated radius fillers of the present disclosure, and the preform sections together with the cavity are subsequently infused with liquid resin under vacuum. The radius fillers should be easily positioned within the cavity, conform to it and should not impact the Resin infusion process nor the performance of the final structural part. The design of the radius filler is a function of the cavity shape and size as well as the position and the role of the filler in the cavity. For the application shown in FIG. 5, the cavity fillers may be based on two different braided structures, each having a specific filling role. The first braid may have a core/shell structure and is the coarser of the two braid types. Its purpose is to fill the maximum space of the cavity. The second braid may have a hollow design and its purpose is to fill the apexes of the cavity, and as such it must be highly deformable and collapsible. Braid design contributes to the good handling performance of the cavity filler. FIG. 6 is a photomicrograph showing the cross-section of an infused stringer structure in which two types of fiber braids discussed above are used. The braids with the hollow design are placed at the apexes of the cavity.

The characteristics of the radius fillers manufactured in the manner described above include:

(a) By only surface coating the surface of the filler, a dry internal portion is retained in the coated filler that aids air evacuation during the lay-up process by maintaining highly permeable vacuum channels within the composite preform.

(b) Through retaining a dry inner portion, the coated radius filler also allows a higher level of manipulation than one achieved with a fully impregnated filler as resin limits the flexibility and handling of the filler.

(c) Through modifying the resin for tack and handling, the coated filler product can be positioned (and re-positioned) with ease while optimizing the out-life of the filler.

(d) Resin coated radius fillers are compatible with their environment during resin infusion, i.e. the surrounding materials.

(e) Addition of a thermoplastic modifier, such as Cytec KM 180, provides a degree of toughening to the base resin.

(f) Addition of a thermoplastic modifier further modifies the out-time tack characteristic of the filler by preventing the migration of the resin to the inner portion of the filler.

Coated radius fillers designed and manufactured according to the present disclosure are affordable and further reduce the overall composite part manufacturing cost by simplifying the part manufacturing process. The resin coating process to manufacture such a product is simple, elegant yet robust as well as being very efficient and results in an end product with very little variation.

EXAMPLES

The coating method and coated filler of the present disclosure may be illustrated by the following non-limiting examples.

Example 1

Using the coating system illustrated by FIG. 2, a continuous dry carbon braid was coated by pulling the braid through a resin bath containing hot-melt epoxy resin (Cycom® 890 RTM) modified with a thermoplastic viscosity modifier (Cytec KM® 180) and out through a rubber grommet provided at the bottom of the resin bath vessel. The braid had a biaxial envelope surrounding a core of longitudinal axial fibers, and an outer diameter (OD) of 0.148 in. The grommet had an inner diameter (ID) of 0.125 in. The resin bath temperature was 173° F., the resin level was 1 in, and the line speed was 48 fpm. The resultant coated braid had a resin content of 6.2% based on the total weight of the coated braid and the inner portion of the braid was free of resin.

Example 2

Using the coating system illustrated by FIG. 2, a continuous dry carbon braid was coated by pulling the braid through a resin bath containing the same resin formulation disclosed in Example 1. The braid had a biaxial envelope surrounding a core of longitudinal axial fibers, and an outer diameter (OD) of 0.08 in. The grommet used in the resin bath vessel had an inner diameter (ID) of 0.08 in. The resin bath temperature was 125° F., the resin level was 2 in, and the line speed was 15 fpm. The resultant coated braid had a resin content of 29% based on the total weight of the coated braid and the inner portion of the braid was free of resin.

What is claimed is:

1. A deformable, coated radius filler in the form of a coated fibrous braid comprising a continuous or elongated fibrous braid and a tacky, resin surface coating, which is substantially uniform in thickness,
wherein
the fibrous braid is comprised of a plurality of fiber yarns intertwined in a braid pattern,
the coated radius filler has a core free of resin and is configured to enable the core to be infused with a liquid resin during a resin infusion process, and
the resin surface coating comprises an epoxy-based resin and a co-polymer of polyetherethersulphone and polyethersulphone as a viscosity modifier, which modifies the out-time tack characteristic of the coated radius filler by preventing the migration of the resin to the core of the fibrous braid.

2. The deformable, coated radius filler according to claim 1, wherein the resin content of the coated radius filler is in the range of 10%-30% by weight based on the total weight of the coated filler.

3. The deformable, coated radius filler according to claim 1, wherein the fibrous braid comprises a core of longitudinal axial yarns and a biaxial or triaxial outer shell.

4. A deformable, coated radius filler in the form of a coated fibrous braid comprising a continuous or elongated fibrous braid structure and a tacky, resin surface coating, which is substantially uniform in thickness,
wherein the fibrous braid structure comprises a biaxial or triaxial outer shell and a hollow core, said core being free of resin, and
wherein the resin surface coating comprises an epoxy-based resin and a viscosity modifier which modifies the out-time tack characteristic of the coated radius filler by preventing the migration of the resin to the core of the fibrous braid.

5. The deformable, coated radius filler of claim 4, wherein the viscosity modifier is selected from a group consisting of cellulose derivatives, polyester, polyamide, polyimide, polycarbonate, polyurethane, poly(methyl methacrylate), polystyrene, polyaromatics; polyesteramide, polyamideimide, polyetherimide, polyaramide, polyarylate, polyacrylate, poly(ester) carbonate, poly(methyl methacrylate/butyl acrylate), polysulphone, polyethersulphone, co-polymer of polyetherethersulphone polyethersulphone, polyetherethersulphone polyethersulphone-etherketone, polyetheretherketone PEEK, (polyetherketoneketone) PEKK, rubber, and combinations thereof.

6. The deformable, coated radius filler of claim 1, wherein the fibrous braid comprises fibers made of carbon, glass, quartz, aramid, or combinations thereof.

7. The deformable, coated radius filler of claim 1, wherein the outer diameter of the coated radius filler is in the range of 0.01 inch to 1.5 inch.

8. A method of forming a resin coated radius filler comprising:
supplying an uncoated, continuous fibrous braid comprised of a plurality of fiber yarns intertwined in a braid pattern;
providing a heated resin formulation in a container, said container having a bottom wall and a deformable grommet positioned through said bottom wall, said grommet being provided with a through hole that is sized to enable the fibrous braid to pass through and at the same time to control the amount of resin deposited onto the outer surface of the fibrous braid; and
pulling the continuous fibrous braid through the resin formulation and out through the grommet to form a resin-coated fibrous braid, whereby only a desired amount of resin is deposited onto the outer surface of the fibrous braid while leaving the core of the fibrous braid free of resin such that core of the resin-coated fibrous braid can be infused with a liquid resin during a resin infusion process,
wherein the fibrous braid's contact time with the resin formulation is controlled by controlling the line speed and the resin level of the resin formulation in the container, and
wherein the resin formulation comprises an epoxy-based resin and a co-polymer of polyetherethersulphone and polyethersulphone, and the viscosity of the resin formulation is controlled to enable the formation of a resin coating with a substantially uniform thickness.

9. The method according to claim 8, wherein said co-polymer of polyetherethersulphone and polyethersulphone is present in an amount of 5% to 20% by weight based on the total weight of the resin formulation.

10. The method according to claim 8, wherein the viscosity of the heated resin bath is maintained in the range of 0.50-1000 Poise, the resin level is maintained in the range of 0.25 inch 3.0 inches within the resin bath container, and the line speed is in the range of about 10 to 150 feet per minute (fpm).

11. A three-dimensional fiber preform suitable for resin infusion comprising:
a plurality of plies of dry, reinforcement fibers configured to form a three-dimensional shaped structure with at least one cavity; and one or more deformable, coated radius fillers of claim 1 positioned in the cavity.

12. The deformable, coated radius filler of claim 1, wherein the fibrous braid comprises a core of longitudinal axial yarns and a biaxial or triaxial outer shell.

13. The deformable, coated radius filler of claim 1, wherein the fibrous braid comprises a biaxial or triaxial outer shell and a hollow core.

14. The deformable, coated radius filler of claim 5, wherein said viscosity modifier is a co-polymer of polyetherethersulphone and polyethersulphone.

15. A three-dimensional fiber preform suitable for resin infusion comprising:
- a plurality of plies of dry, reinforcement fibers configured to form a three-dimensional shaped structure with at least one cavity; and
- at least one deformable, coated radius filler of claim 4 positioned in the cavity.

\* \* \* \* \*